(12) United States Patent
Virag et al.

(10) Patent No.: US 11,420,703 B2
(45) Date of Patent: Aug. 23, 2022

(54) SCOOTER AND METHOD FOR OPERATING A SCOOTER

(71) Applicant: AUDI AG, Ingolstadt (DE)

(72) Inventors: Istvan Virag, Ingolstadt (DE); Franz Reinwald, Ingolstadt (DE); Christian Pöppel, Altmannstein (DE); Mathias Neumann, Großmehring (DE); Michael Karmann, Pförring (DE); Sebastian Ordner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 157 days.

(21) Appl. No.: 16/967,235

(22) PCT Filed: Apr. 18, 2019

(86) PCT No.: PCT/EP2019/058367
§ 371 (c)(1),
(2) Date: Aug. 4, 2020

(87) PCT Pub. No.: WO2019/206589
PCT Pub. Date: Oct. 31, 2019

(65) Prior Publication Data
US 2021/0046994 A1      Feb. 18, 2021

(30) Foreign Application Priority Data
Apr. 23, 2018  (DE) ............... 10 2018 206 225.0

(51) Int. Cl.
*B62K 5/00*   (2013.01)
*B62K 5/10*   (2013.01)
(Continued)

(52) U.S. Cl.
CPC ............ B62K 5/10 (2013.01); B62K 3/002 (2013.01); B62K 5/08 (2013.01); *B62K 2202/00* (2013.01)

(58) Field of Classification Search
CPC . B60K 5/08; B60K 5/10; B60K 3/002; B60K 21/00
See application file for complete search history.

(56) References Cited

U.S. PATENT DOCUMENTS 4,054,297 A * 10/1977 Solimine ............... A63C 17/01
                                                        280/11.28
6,279,930 B1 * 8/2001 Chang .................... B62K 3/002
                                                        280/87.043
(Continued)

FOREIGN PATENT DOCUMENTS

CN    200977848 Y    11/2007
CN    201800767 U    4/2011
(Continued)

OTHER PUBLICATIONS

Notification of Transmittal of Copies of Translation of the International Preliminary Report on Patentability dated Nov. 5, 2020, in connection with corresponding international application No. PCT/EP2019/058367 (7 pages).

(Continued)

*Primary Examiner* — Hau V Phan
(74) *Attorney, Agent, or Firm* — Maier & Maier, PLLC (57) ABSTRACT

A scooter with a footboard providing a contact surface for a user of the scooter, with a front axle including a first front wheel and a second front wheel and a rear axle comprising a first rear wheel and a second rear wheel, and with a steering column for steering at least the front wheels. Inclination of the footboard about a roll axis of the footboard effects a steering angle of the two front wheels in a first direction and, at the same time, a steering angle of the two rear wheels in a second direction opposite the first direction. The disclosure further relates to a method for operating such a scooter.

16 Claims, 6 Drawing Sheets

(51) Int. Cl.
    *B62K 3/00*     (2006.01)
    *B62K 5/08*     (2006.01)

(56) References Cited

U.S. PATENT DOCUMENTS

| | | | |
|---|---|---|---|
| 6,286,843 B1 | 9/2001 | Lin | |
| 6,382,646 B1* | 5/2002 | Shaw | B62K 3/002 |
| | | | 280/87.041 |
| 6,398,238 B1* | 6/2002 | Shaw | B62K 3/002 |
| | | | 280/87.041 |
| 6,520,517 B1* | 2/2003 | Chung | B62K 3/002 |
| | | | 280/124.11 |
| 6,616,155 B2* | 9/2003 | Tuan | A63C 17/01 |
| | | | 280/87.041 |
| 6,910,743 B2* | 6/2005 | Cheng | B60B 11/00 |
| | | | 301/111.01 |
| 7,040,443 B1* | 5/2006 | Roth | B62K 3/002 |
| | | | 180/68.5 |
| 7,121,566 B2* | 10/2006 | McClain | A63C 17/012 |
| | | | 280/11.28 |
| 7,243,925 B2* | 7/2007 | Lukoszek | A63C 17/0093 |
| | | | 280/11.28 |
| 7,316,408 B2* | 1/2008 | McClain | A63C 17/012 |
| | | | 280/11.28 |
| 8,740,236 B2* | 6/2014 | Ouboter | B62K 9/02 |
| | | | 280/200 |
| 8,936,251 B1* | 1/2015 | Pereira | A63C 17/0066 |
| | | | 280/11.28 |
| 8,939,454 B2* | 1/2015 | Stillinger | B62K 21/00 |
| | | | 280/271 |
| 8,985,602 B2* | 3/2015 | Chan | B62K 5/02 |
| | | | 280/87.041 |
| 9,592,876 B2* | 3/2017 | Lovley, II | B62K 5/05 |
| 10,160,507 B2* | 12/2018 | Chung | B62K 15/006 |
| 2005/0127629 A1 | 6/2005 | Nelson et al. | |
| 2010/0327546 A1* | 12/2010 | Nelson | A63C 17/013 |
| | | | 280/124.1 |
| 2014/0091546 A1* | 4/2014 | Lovley, II | B62K 11/00 |
| | | | 280/87.041 |
| 2019/0058982 A1* | 2/2019 | Lee | B62K 19/40 |

FOREIGN PATENT DOCUMENTS

| | | |
|---|---|---|
| CN | 102806943 A | 12/2012 |
| CN | 205220924 U | 5/2016 |
| DE | 2727561 A1 | 12/1977 |
| DE | 20003824 U1 | 5/2000 |
| DE | 20020658 U1 | 3/2001 |
| DE | 20021083 U1 | 3/2001 |
| DE | 20103486 U1 | 5/2001 |
| DE | 20108067 U1 | 8/2001 |
| DE | 102007032513 A1 | 10/2008 |
| DE | 102016117382 A1 | 3/2018 |
| TW | 481136 U | 3/2002 |
| WO | 2017/035285 A1 | 3/2017 |

OTHER PUBLICATIONS

Chinese Office Action dated Sep. 9, 2021, in connection with corresponding CN Application No. 201980015154.9 (11 pp., including machine-generated English translation).

German Examination Report dated Dec. 20, 2018 in corresponding German Application No. 10 2018 206 225.0; 20 pages; Machine translation attached.

German Examination Report dated Jan. 31, 2020 in corresponding German Application No. 10 2018 206 225.0; 16 pages; Machine translation attached.

International Search Report (with English translation) and Written Opinion (with Machine translation) dated Jun. 14, 2019 in corresponding International Application No. PCT/EP2019/058367; 19 pages.

Chinese Office Action dated Apr. 22, 2021, in connection with corresponding CN Application No. 201980015154.9 (16 pp., including machine-generated English translation).

\* cited by examiner

SCOOTER AND METHOD FOR OPERATING A SCOOTER

FIELD

The disclosure relates to scooter with a footboard providing a contact surface for a user of the scooter. A front axle of the scooter includes a first front wheel and a second front wheel, and a rear axle of the scooter comprises a first rear wheel and a second rear wheel. A steering column is provided for steering at least the front wheels. The disclosure further relates to a method for operating such a scooter.

BACKGROUND

There are kick scooters commercially available which comprise a front axle with two front wheels and a rear axle with two rear wheels, in which a steering column is provided with a handlebar for steering the scooter. Considered to be disadvantageous with such scooters is the fact that only a comparatively large turning radius can be achieved when steering.

Furthermore, DE 10 2016 117 382 A1 describes a push car which can be steered by turning a steering lever or through weight transfer.

SUMMARY

An object of the present invention is to obtain a scooter of the aforementioned type with improved steering and to indicate a correspondingly improved method for operating such a scooter.

The scooter according to the invention comprises a footboard which provides a contact surface for a user of the scooter. A front axle of the scooter comprises a first front wheel and a second front wheel. A rear axle of the scooter comprises a first rear wheel and a second rear wheel. The scooter comprises a steering column for steering at least the front wheels. Inclination of the footboard about a roll axis of the footboard effects a steering angle of the two front wheels in a first direction and, at the same time, a steering angle of the two rear wheels in a second direction opposite the first direction. An especially tight turn radius can be achieved due to this opposite turning of the front wheels and the rear wheels when steering the scooter. Furthermore, especially quickly responsive steering is thus provided. Accordingly, a scooter with improved steering is obtained.

The opposite turning of the front wheels and the rear wheels can be effected due to transfer of the weight of the user standing on the footboard of the scooter. The weight transfer results in inclination of the footboard about the roll axis or longitudinal axis of the footboard. When the front wheels and the rear wheels are turned during steering, a median plane of the respective wheel, as relates to a straight-ahead position of the respective wheel, is inclined about a steering angle specifying the turning angle.

Preferably, the front axle and the rear axle comprise a respective crossmember, wherein a first bolt, which extends in the direction of the roll axis of the footboard, is arranged in the crossmember. The first bolt in the crossmember can be rotated through inclination of the footboard. Provision of the first bolt especially simply ensures that the steering angle of the front wheels and the opposed steering angle of the rear wheels can be effected through the transfer of weight of the user of the scooter standing on the footboard, which effects the inclination of the footboard about the roll axis.

Preferably, at least one further bolt is arranged, spaced apart from the first bolt, in a retainer in the radial direction of the first bolt. The retainer is formed in the crossmember. In this case, an elastic element is arranged between a wall of the crossmember and the further bolt, said wall delimiting the retainer. The elastic element ensures that the footboard cannot be too easily tilted or inclined about the roll axis to the extent that a damped steering is implemented. In addition, the elastic element ensures that the footboard is moved back into a non-inclined starting position or initial position as soon as the user is no longer causing the inclination of the footboard about the roll axis due to the user's transfer of weight. Thus, an automatic resetting of the footboard into its starting position in which the footboard is not tilted can be implemented.

It has proven to be further advantageous when the elastic element is formed as a sleeve enclosing the at least one further bolt, said sleeve being formed from an elastic material. Thus, on the one hand, the at least one further bolt is especially securely retained in the retainer. On the other hand, the at least one further bolt can be moved in a plurality of different directions due to the inclination or tilt of the footboard. In addition, the elastic element effects a resetting of the further bolt into any of these directions and thus also of the footboard back to its starting position. The elastic element is not compressed or at least mostly uncompressed in the starting position of the at least one further bolt.

In particular, a first further bolt and a second further bolt may be arranged, in respective retainers, on both sides of the first bolt, said retainers being formed in the crossmember. An especially uniform resetting of the footboard back into its non-tilted starting position can thereby be achieved, in which the footboard is aligned substantially horizontally as relates to the ground.

Preferably, a steering lever is retained on the crossmember, it being possible to move said steering lever about an axis extending in a vertical direction of the crossmember. In a region spaced apart from the axis, the steering lever is connected to a first steering knuckle via a first steering rod and connected to a second steering knuckle via a second steering rod. Such a steering lever, which is movable about the axis extending in the vertical direction of the crossmember, enables a very direct and robust transfer of the steering input to the steering knuckle as a result of the inclination of the footboard. Thus, the steering angle of the front wheels and the opposed steering angle of the rear wheels can be achieved in an especially functionally reliable manner through inclination of the footboard.

Preferably, the first front wheel is arranged on the first steering knuckle of the front axle, and the second front wheel is arranged on the second steering knuckle of the front axle. In addition, the first rear wheel is then arranged on the first steering knuckle of the rear axle, and the second rear wheel is arranged on the second steering knuckle of the rear axle. In this case, the steering knuckles can be rotated about the respective axes of rotation formed in the crossmember. Such axes of rotation can be provided, for example, by bolts or pins which are guided through or inserted into passages or holes formed in the crossmember and which are connected to the respective steering knuckle. Steering is thereby improved with respect to robustness and functional reliability.

The axes of rotation of the steering knuckle formed in the crossmember can be aligned at an angle, particularly in relation to the vertical direction of the crossmember. In this case, when the scooter is upright on the ground, the axes of rotation can have a greater distance from one another at the ground than above the ground. Such an alignment of the axes of rotation tilted toward each other enables a good road position of the scooter during travel with same.

Preferably, the steering lever can be moved about the axis by means of an engaging transfer element a distance away from the axis. In this case, an alignment of the transfer element can be changed through the inclination of the footboard. The transfer element may be formed, for example, as a pin or the like engaging the steering lever in the distance from the axis, said pin or the like effecting the movement of the steering lever about the axis when the footboard is inclined due to the transfer of weight of the user standing on the footboard. This is also beneficial to a very direct and quickly responsive steering of the scooter. The pin is particularly implemented on the footboard.

Preferably, the alignment of the transfer element engaging the steering lever of the front axle can be modified by changing an alignment of the steering column of the scooter. The user then only needs to tilt the steering column about the roll axis or longitudinal axis of the footboard in order to effect the inclination of the footboard and thus also the turning of the front wheels and simultaneously the rear wheels of the scooter. This makes the steering of the scooter especially simple.

The scooter may have a braking device for slowing a rotational movement of at least one of the rear wheels. For example, the user can implement deceleration of the rear wheels of the scooter by actuating a brake pedal. In this case, depressing the brake pedal can effect a pull on a cable pull or the like, which, in turn, pulls a brake lining of the braking device up against a brake disc of the braking device. Thus, a reliable and comfortable braking of the scooter can be effected in an especially simple manner.

It has been shown to be further advantageous when at least one of the front wheels of the scooter can be driven by means of at least one electric motor. The user of the scooter does not need then to continue movement of the scooter solely with muscle power. The at least one electric motor can be formed, for example, as a wheel hub motor.

Finally, it has proven to be advantageous when an electrical energy storage device formed for powering the electric motor is arranged on the steering column of the scooter. In this manner, improved steering is also implemented for a scooter with an electric drive. The electrical energy storage device can be formed as a rechargeable battery.

With the method according to the invention for operating a scooter with a footboard which provides a contact surface for a user of the scooter, with a front axle comprising a first front wheel and a second front wheel and a rear axle comprising a first rear wheel and a second wheel, and with a steering column for steering at least the front wheels, a steering angle of the two front wheels can be effected in a first direction through inclination of the footboard about a roll axis of the footboard. At the same time, a steering angle of the two rear wheels is effected in a second direction, opposite the first direction, due to inclination of the footboard about the roll axis. Accordingly, a method which is improved as relates to the steering is obtained for operating a scooter.

The invention also comprises the combinations of the described embodiments.

The invention also includes refinements of the method according to the invention, which have features as they have already been described in association with the refinements of the scooter according to the invention. For this reason, the corresponding refinements of the method according to the invention are not described again here.

BRIEF DESCRIPTION OF THE FIGURES

Exemplary embodiments of the invention are described in the following. The following is shown.

DETAILED DESCRIPTION

The exemplary embodiments explained in the following refer to preferred embodiments of the invention. With the exemplary embodiments, the described components of the embodiments represent individual features of the invention that are to be considered independently of one another, each of which also further develop the invention independently of one another and thus also are to be considered individually or in a combination that is different than the one shown as a component of the invention. Furthermore, the described embodiments can also be supplemented through further described features of the invention.

In the figures, elements which are functionally equivalent are each given the same reference numerals.

Figure 1:
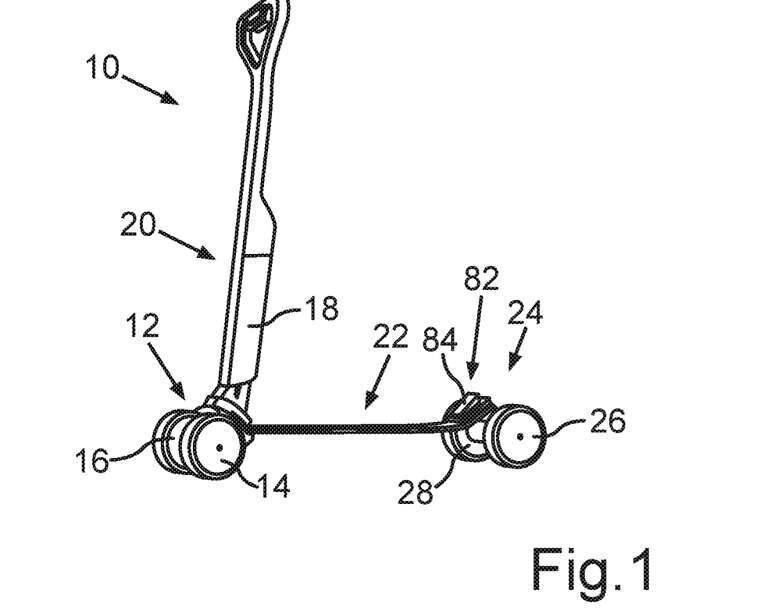
FIG. 1 a perspective view of a scooter with two electrically driven front wheels and two non-driven rear wheels which can preferably be decelerated.

FIG. 1 shows a perspective view of a scooter 10, which is formed, for example, as an electrically driven scooter 10. The scooter 10 may also be formed, however, as a kick scooter, which is propelled forward solely using the muscle power of a user of the scooter 10. The scooter 10 comprises a front axle 12 with a first front wheel 14 and a second front wheel 16. With an embodiment of the scooter 10 as an electrically drivable scooter, the front wheels 14, 16 can be driven by means of respective electric motors (not shown), which may be formed, for example, as wheel hub motors. In this case, a rechargeable battery 18, which is preferably arranged on a steering column 20 of the scooter 10, supplies electrical energy to power the electric motors.

Figure 2:
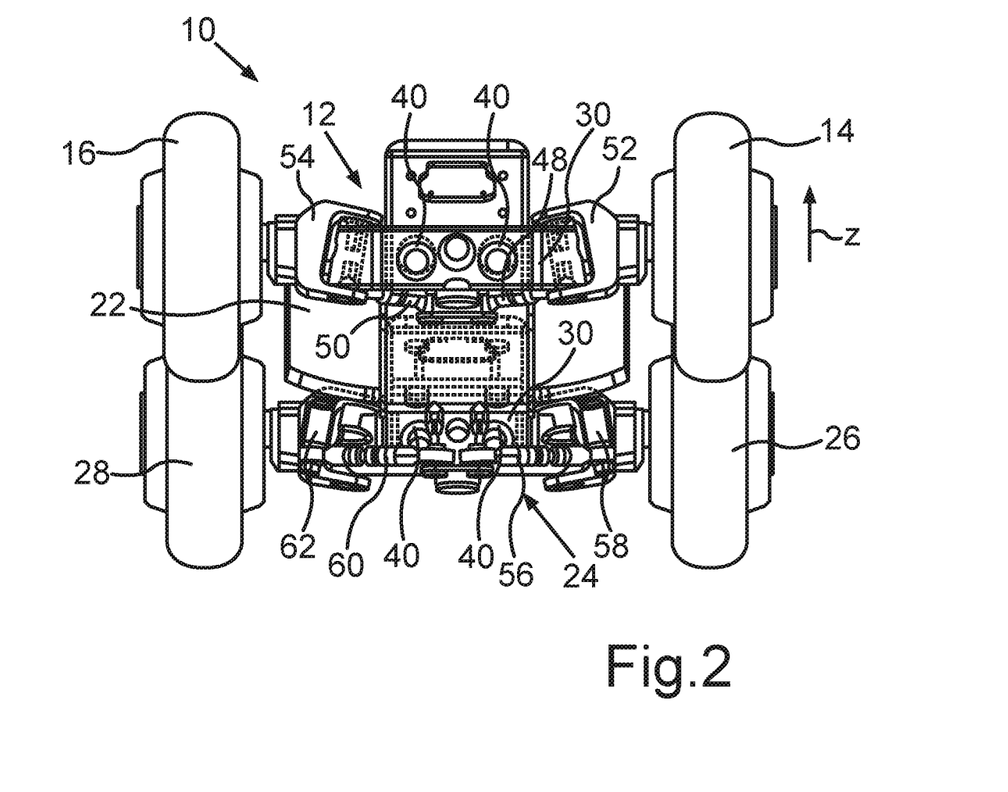
FIG. 2 a perspective view of a lower side of a footboard of the scooter as well as a front axle of the scooter and a rear axle of the scooter from the lower front.

The scooter 10 has a footboard 22, on which a user of the scooter 10 can stand. A rear axle 24 of the scooter 10 comprises a first rear wheel 26 and a second rear wheel 28. FIG. 1 only shows a brake pedal 84 from the braking device 82 of the scooter 10, which functions to decelerate a rotational movement of the rear wheels 26, 28. The view from FIG. 2 shows that the front axle 12 and the rear axle 24 comprise a respective crossmember 30.

Figure 3:
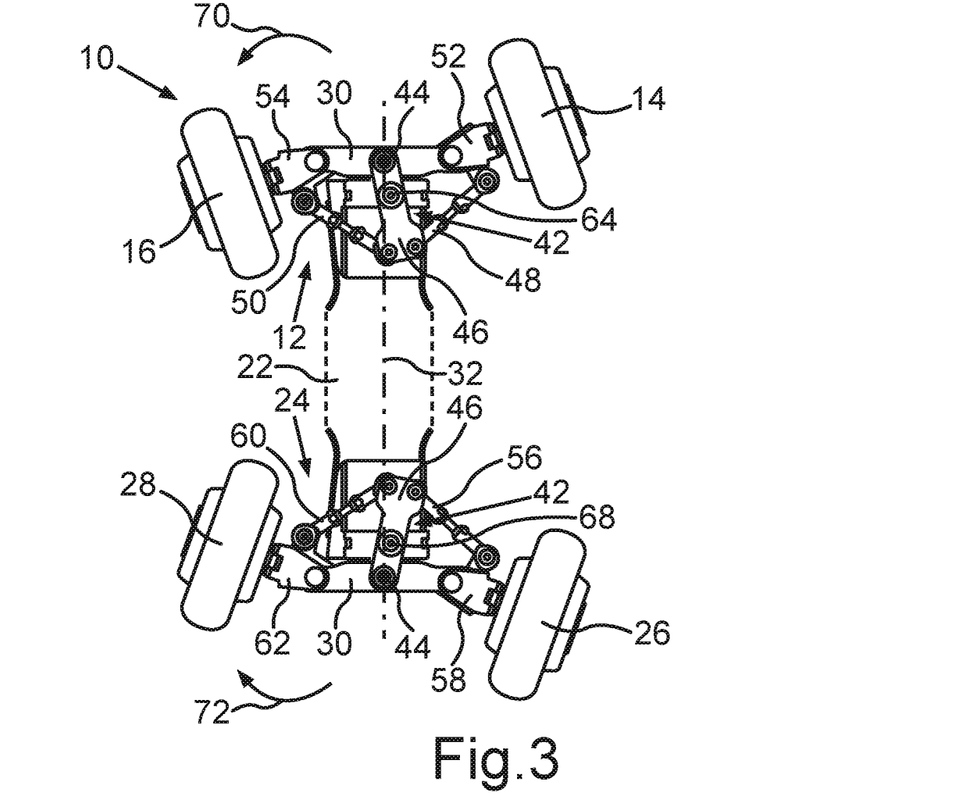
FIG. 3 a schematic view of the front axle and the rear axle of the scooter from below as the scooter is being driven through a right turn.
Figure 4:
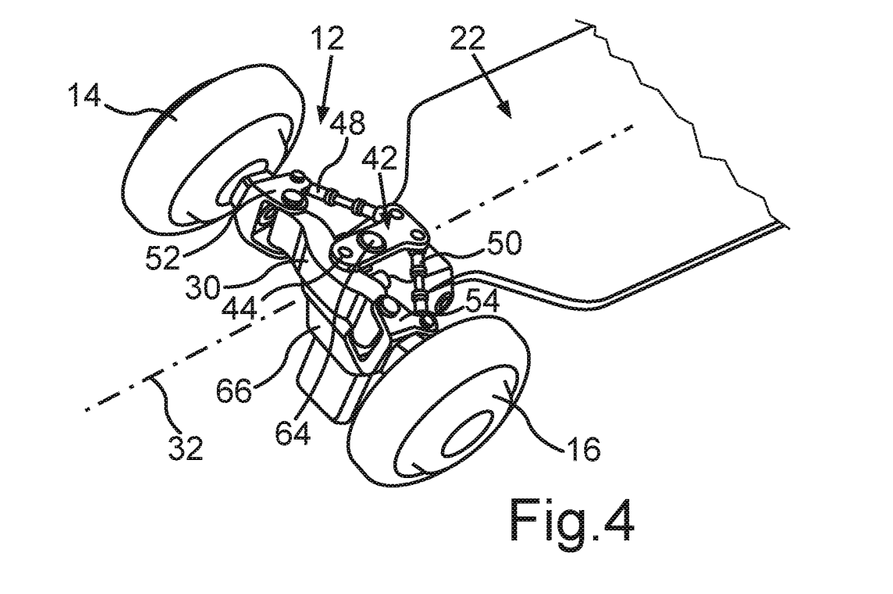
FIG. 4 a perspective view from below of the front axle of the scooter, wherein a lower side of the footboard can also be seen.

The crossmember 30 of the front axle 12 is shown in a perspective view in FIG. 4, in which a lower side of the footboard 22 is also shown. Furthermore, FIG. 3 shows the respective crossmember 30 in a view of the front axle 12 from below and of the rear axle 24 from below. For the sake of clarity, FIG. 3 shows the footboard 22 of the scooter 10 as a diagram only.

Figure 5:
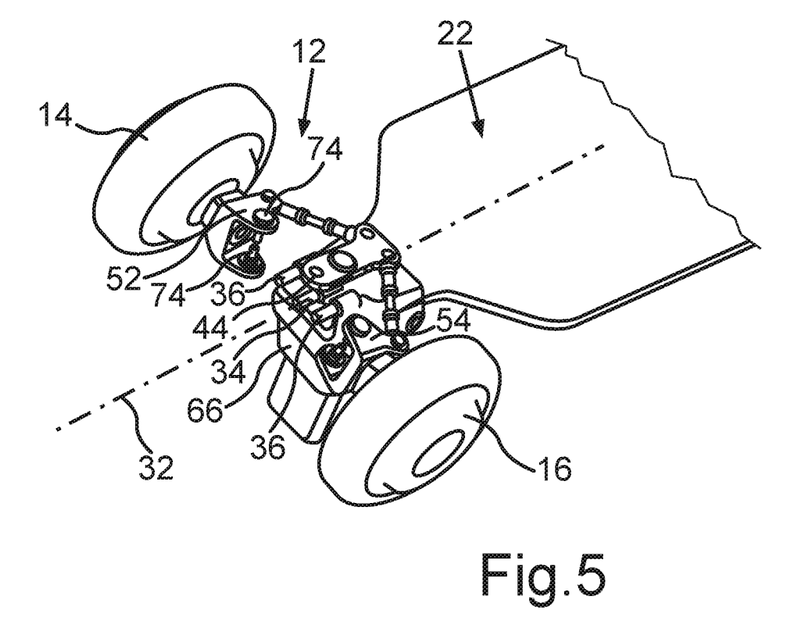
FIG. 5 a further perspective view according to FIG. 4, wherein a crossmember of the front axle is not shown.

In addition, FIG. 3 shows a roll axis 32 of the footboard 22, about which the footboard 22 can be inclined in order to steer the scooter 10. FIGS. 4 and 5 also show the roll axis 32 corresponding to a longitudinal axis of the footboard 22. FIG. 5 shows that the roll axis 32 extends in the direction of a first bolt 34, which is arranged in the crossmember 30. When the footboard 22 inclines about the roll axis 32 due to the transfer of weight of the user standing on the footboard 22, the first bolt 34 rotates in the crossmember 30.

Figure 6:
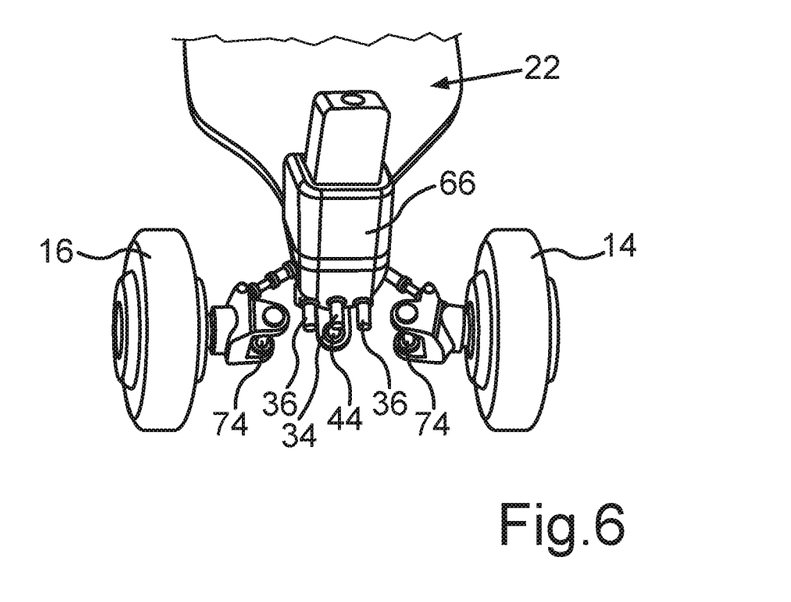
FIG. 6 a perspective view from above of the front axle of the scooter without the crossmember, wherein an upper side of the footboard can also be seen.
Figure 7:
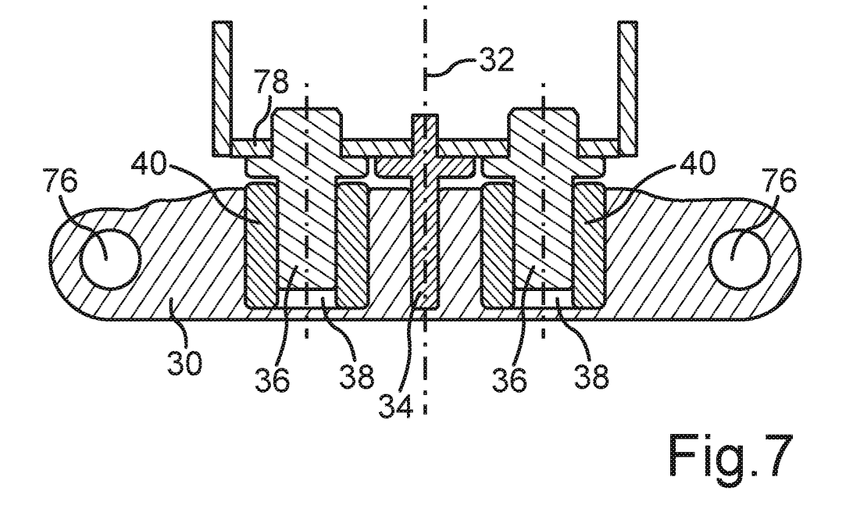
FIG. 7 a horizontal sectional view of the crossmember in the region of bolts arranged in the crossmember.

FIGS. 5 and 6, but particularly FIG. 7, show that two further bolts 36, which are spaced apart from the first bolt 34 in the radial direction of the first bolt 34, are arranged in corresponding retainers 38, which are formed in the crossmember 30. The first bolt 34 and the further bolts 36 are shown in FIGS. 5 and 6 without the crossmember 30. Elastic elements in the form of respective sleeves 40, which are formed from an elastic material or an elastomer, are arranged in the respective retainers 38, which are formed in the crossmember 30 (cf. FIG. 7).

When the footboard 22 is inclined about its roll axis 32, the further bolts 36, which are likewise extended parallel to the roll axis 32, compress the sleeves 40 formed from the elastic material 40. On the one hand, this ensures damping of the chassis of the scooter 10 during steering of same and, on the other hand, an automatic resetting of the footboard 22 in its non-deflected or non-inclined starting position, in which the footboard 22 is aligned substantially level as relates to the ground on which the scooter 10 is stopped or moving.

The steering of the scooter 10 due to the transfer of weight of the user standing on the upper side of the footboard 22 will now be explained with reference to FIG. 3. A plate-shaped steering lever 42 is retained on the crossmember 30, on the lower side of the crossmember 30 in this case. The steering lever 42 is movable about an axis 44 which extends in a vertical direction z of the crossmember 30. The vertical direction z is indicated by an arrow in FIG. 2. A first steering rod 48 and a second steering rod 50 are connected to the steering lever 42 of the front axle 12 in a region 46 of the steering lever 42 spaced apart from said axis 44. According to FIG. 3, the steering lever 42 of the front axle 12 is connected to a first steering knuckle 52 via the first steering rod 48, the first front wheel 14 being arranged on said steering knuckle. Furthermore, the second steering rod 50 of the front axle 12 is connected to a second steering knuckle 54, on which the second front wheel 16 is arranged.

In a similar manner, a first steering knuckle 56 is attached to the region 46 of the steering lever 42 of the rear axle 24 spaced apart from the axis 44, the steering lever 42 of the rear axle 24 being connected to a first steering knuckle 58 of the rear axle 24 via the steering knuckle. The first rear wheel 26 is arranged on the first steering knuckle 58. Furthermore, the steering lever 42 is connected to a second steering knuckle 62 of the rear axle 24 via a further steering rod 60. The second rear wheel 28 is arranged on the second steering knuckle 62 of the rear axle 24.

When the footboard 22 is inclined about its roll axis 32, a transfer element 64 executes a movement, particularly a pivot movement of the steering lever 42 of the front axle 12 about axis 44. The transfer element 64, which is only shown in reference to its position on the front axle 12 in FIGS. 3 and 4, can be formed, for example, as a pin coupled to the footboard 22, said pin engaging the steering lever 42 of the front axle 12 in the space apart from axis 44. The alignment of this transfer element 64 on the front axle 12 can also be modified by changing an alignment of the steering column 20 of the scooter 10. To this end, the steering column 20 is coupled to a support 66, which is arranged in the region of the front axle 12 (cf. especially FIGS. 4 and 6). The pin coupled to the footboard 22 or such type of transfer element 64 in this case is preferably aligned with a longitudinal axis of the steering column 20.

In the region of the rear axle 24, a transfer element 68 similar to the transfer element 64 of the front axle 12 is provided, said element being coupled to the footboard 22. This transfer element 68 is also only shown in reference to its position on the rear axle 24 in FIG. 3 and can be formed, for example, as a pin coupled to the footboard 22, said pin engaging the steering lever 42 of the rear axle 24 in the space apart from axis 44.

The movement of the steering lever 42 of the front axle 12 about axis 44 effects a steering angle of the two front wheels 14, 16 in a first direction 70, which is indicated by a curved arrow in FIG. 3. In a similar manner, the movement of the steering lever 42 of the rear axle 24 about axis 44 effects a steering angle of the two rear wheels 26, 28 in a second direction 72, which is opposite the first direction 70. The second direction 72 is indicated by a further curved arrow in FIG. 3. An especially tight turn radius can be achieved with the scooter 10 due to this opposite turning of the front wheels 14, 16 and the rear wheels 26, 28.

The steering associated with the steering angle of the front wheels 14, 16 and the rear wheels 26, 28 can be effected with the scooter 10 by means of the transfer of weight of the user standing on the upper side of the footboard 22. The user causes the footboard 22 to incline about the roll axis 32 specifically through the transfer of weight of the user. The steering input in this case is transmitted to the steering knuckles 52, 54, 58, 62 via the steering rods 48, 50, 56, 60. The steering is implemented via all four wheels of the scooter 10. In particular, the steering of all four wheels, i.e. the two front wheels 14, 16 and the two rear wheels 26, 28, is implemented by means of the transfer of weight of the user standing on the footboard 22.

Furthermore, FIG. 3 shows that the regions 46 of the steering lever 42 of the front axle 12 and of the rear axle 24, to which the steering rods 48, 50, 56, 60 are attached, are facing one another. These regions 46 of the two steering levers 42 are thus closer to one another than the two axes 44 of the two steering levers 42.

Figure 9:
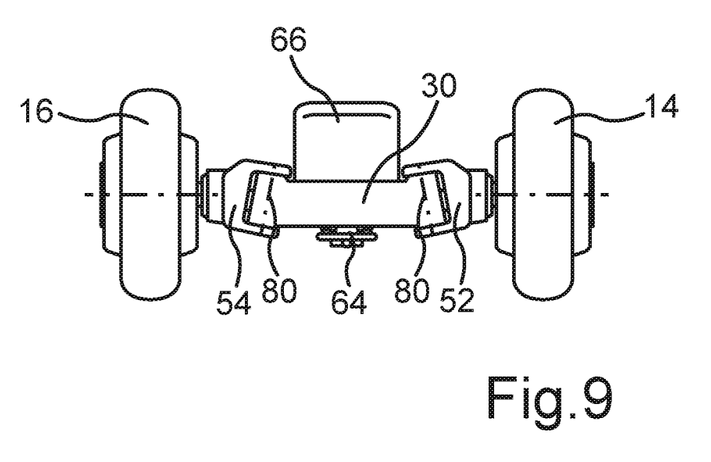
FIG. 9 a view of the front axle from below and a view of the front axle from the front as the scooter travels straight ahead.

In particular, FIG. 5 clearly shows that the steering knuckles 52, 54 of the front axle 12 are rotatable about respective axes of rotation 80, which are formed in the crossmember 30 (cf. FIG. 9). As shown by example in this case, these preferably inclined axes of rotation 80 may be provided by pins 74, which pass through the steering knuckles 52, 54 and are inserted into corresponding holes or passages 76, which are formed in the crossmember 30 (cf. FIG. 7).

FIG. 6 clearly shows that the steering lever 42 can have a passage in the region of axis 44 in order to rotatably attach the steering lever 42 to the crossmember 30 in the region of axis 44.

The passages 76 are especially easy to discern from the horizontal section of the crossmember 30 in FIG. 7, with the pins 74 (cf. FIG. 5) passing through said passages in order to rotatably attach the steering knuckles 52, 54 to the crossmember 30 about the axes of rotation 80. Furthermore, FIG. 7 clearly shows that the bolts 34, 36 may be connected to the footboard 22 via a profile part 78 or the like so that the tilting motion or the inclination of the footboard 22 about the roll axis 32 can especially simply effect the movement of the further bolts 36 in the respective retainers 38 and the rotation of the first bolt 34 about the roll axis 32.

Figure 8:
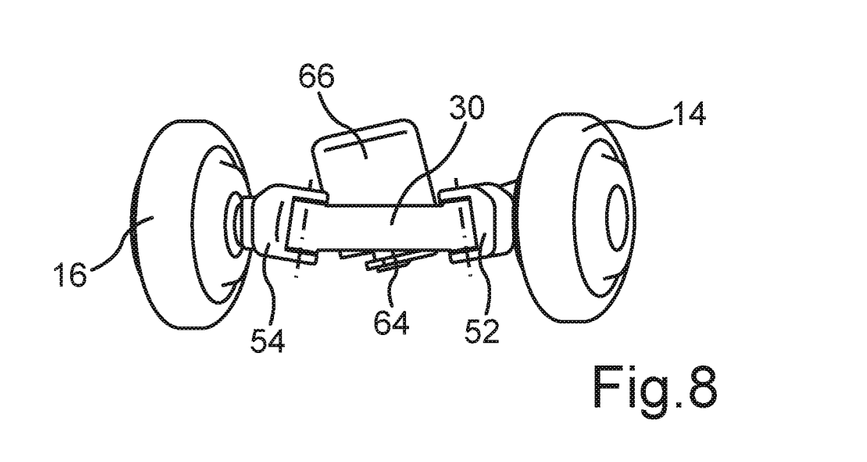
FIG. 8 a view of the front axle from below and a view of the front axle from the front as the scooter travels through a right turn.

FIG. 8 clearly shows that the steering angle of the front wheels 14, 16 as the scooter is traversing a right turn can be effected by tilting the steering column 20, which is coupled to the support 66.

According to FIG. 9, the footboard 22 is not inclined when the scooter 10 is traveling straight ahead or on a straightaway. Thus, the steering column 20 and the support 66 are also aligned substantially vertically. FIG. 9 shows the inclined alignment of the axes of rotation 80 especially well, which are provided by means of the pins 74 (cf. FIG. 5) inserted into the passages 76 of the crossmember 30 (cf. FIG. 7).

Figure 10:
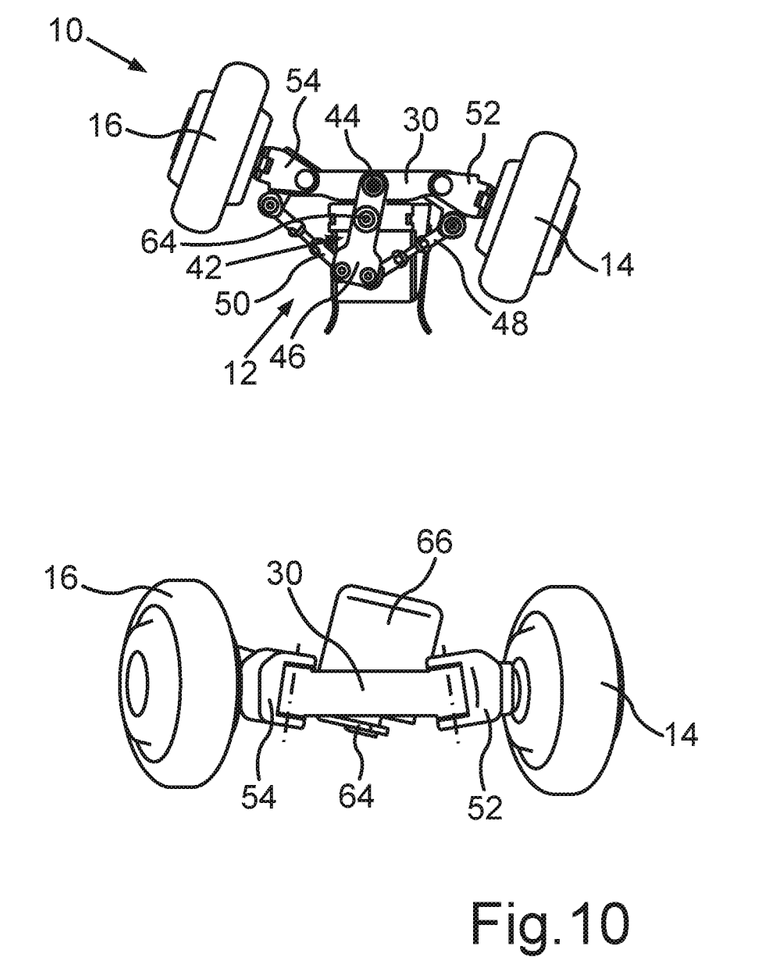
FIG. 10 a view of the front axle from below and a view of the front axle from the front as the scooter travels through a left turn.

In addition, FIG. 10 shows how the traversing of a left turn with the scooter 10 can be effected by means of inclination of the footboard 22 about the roll axis 32 in the direction opposite the direction according to FIG. 8. Inclination of the footboard 22 about the roll axis 32 by means of a transfer weight of the user can be supported by a corresponding tilting of the steering column 20, which the user can grasp on a handle part of the steering column 20 to do this.

As a whole, the examples show how steering can be achieved by means of a transfer of weight with automatic resetting through a corresponding axis system of the scooter 10 at the front and rear, even with an electrically driven scooter 10.

The invention claimed is:

1. A scooter comprising:
a footboard providing a contact surface for a user of the scooter, with a front axle comprising a first front wheel and a second front wheel and a rear axle comprising a first rear wheel and a second rear wheel, and with a steering column for steering at least the front wheels,
wherein rotation of the footboard about a roll axis of the footboard simultaneously effects (1) a steering angle of the two front wheels in a first direction and (2) a steering angle of the two rear wheels in a second direction opposite the first direction,
wherein the front axle and the rear axle each comprise a respective crossmember,
wherein a first bolt is arranged in the crossmember, said first bolt extending along the roll axis of the footboard and being rotatable in the crossmember in response to rotation of the footboard, and
wherein a steering lever is retained on the crossmember, said steering lever being rotatable about an axis extending in a vertical direction of the crossmember and which is connected to a first steering knuckle via a first steering rod and connected to a second steering knuckle via a second steering rod in a region spaced apart from the axis.

2. The scooter according to claim 1, wherein at least one further bolt, which is spaced apart from the first bolt in the radial direction of the first bolt, is arranged in a retainer formed in the crossmember, and
wherein an elastic element is arranged between a wall of the crossmember and the further bolt, said wall delimiting the retainer.

3. The scooter according to claim 2, wherein the elastic element is formed as a sleeve enclosing the at least one further bolt, said sleeve being formed from an elastic material.

4. The scooter according to claim 1, wherein the first front wheel is arranged on the first steering knuckle of the front axle, and the second front wheel is arranged on the second steering knuckle of the front axle, and/or the first rear wheel is arranged on the first steering knuckle of the rear axle, and the second rear wheel is arranged on the second steering knuckle of the rear axle, and
wherein the steering knuckles are rotatable about respective axes of rotation, formed in the crossmember.

5. The scooter according to claim 1, wherein the steering lever is movable about the axis by a transfer element engaging in a space apart from the axis, and
wherein an alignment of the transfer element is modifiable by the rotation of the footboard.

6. The scooter according to claim 5, wherein the alignment of the transfer element engaging the steering lever of the front axle is modifiable by changing an alignment of the steering column of the scooter.

7. The scooter according to claim 1, wherein the scooter has a braking device for slowing a rotational movement of at least one of the rear wheels, and/or at least one of the front wheels is driven at least one electric motor, and
wherein an electrical energy storage device formed for powering the electric motor is arranged on the steering column.

8. A method for operating a scooter, the scooter comprising:
a footboard providing a contact surface for a user of the scooter, with a front axle including a first front wheel and a second front wheel and a rear axle comprising a first rear wheel and a second rear wheel, and with a steering column for steering at least the front wheels,
wherein the front axle and the rear axle each comprise a respective crossmember,
wherein a first bolt is arranged in the crossmember, said first bolt extending along a roll axis of the footboard and being rotatable in the crossmember in response to rotation of the footboard,
wherein a steering lever is retained on the crossmember, said steering lever being rotatable about an axis extending in a vertical direction of the crossmember and which is connected to a first steering knuckle via a first steering rod and connected to a second steering knuckle via a second steering rod in a region spaced apart from the axis,
the method comprising:
rotation of the footboard about the roll axis of the footboard to simultaneously effect (1) a steering angle of the two front wheels in a first direction and (2) a steering angle of the two rear wheels in a second direction opposite the first direction.

9. A scooter comprising:
a footboard providing a contact surface for a user of the scooter, with a front axle comprising a first front wheel and a second front wheel and a rear axle comprising a first rear wheel and a second rear wheel, and with a steering column for steering at least the front wheels,
wherein rotation of the footboard about a roll axis of the footboard simultaneously effects (1) a steering angle of the two front wheels in a first direction and (2) a steering angle of the two rear wheels in a second direction, opposite the first direction, wherein the front axle and the rear axle each comprise a respective crossmember, wherein a first bolt is arranged in the crossmember, said first bolt extending along the roll axis of the footboard and being rotatable in the crossmember in response to rotation of the footboard, wherein at least one further bolt, which is spaced apart from the first bolt in the radial direction of the first bolt, is arranged in a retainer formed in the crossmember, and wherein an elastic element is arranged between a wall of the crossmember and the further bolt, said wall delimiting the retainer.

10. The scooter according to claim 9, wherein the elastic element is formed as a sleeve enclosing the at least one further bolt, said sleeve being formed from an elastic material.

11. The scooter according to claim 9, wherein a steering lever is retained on the crossmember, said steering lever being rotatable about an axis extending in a vertical direction of the crossmember and which is connected to a first steering knuckle via a first steering rod and connected to a second steering knuckle via a second steering rod in a region spaced apart from the axis.

12. The scooter according to claim 11, wherein the first front wheel is arranged on the first steering knuckle of the front axle, and the second front wheel is arranged on the second steering knuckle of the front axle, and/or the first rear wheel is arranged on the first steering knuckle of the rear axle, and the second rear wheel is arranged on the second steering knuckle of the rear axle, and wherein the steering knuckles are rotatable about respective axes of rotation, formed in the crossmember.

13. The scooter according to claim 11, wherein the steering lever is movable about the axis by a transfer element engaging in a space apart from the axis, and wherein an alignment of the transfer element is modifiable by the rotation of the footboard.

14. The scooter according to claim 13, wherein the alignment of the transfer element engaging the steering lever of the front axle is modifiable by changing an alignment of the steering column of the scooter.

15. The scooter according to claim 9, wherein the scooter has a braking device for slowing a rotational movement of at least one of the rear wheels, and/or at least one of the front wheels is driven by at least one electric motor, and wherein an electrical energy storage device formed for powering the electric motor is arranged on the steering column.

16. A method for operating the scooter according to claim 9, the method comprising:

rotation of the footboard about the roll axis of the footboard to simultaneously effect (1) the steering angle of the two front wheels in the first direction and (2) the steering angle of the two rear wheels in the second direction, opposite the first direction.

\* \* \* \* \*